Figure 1:
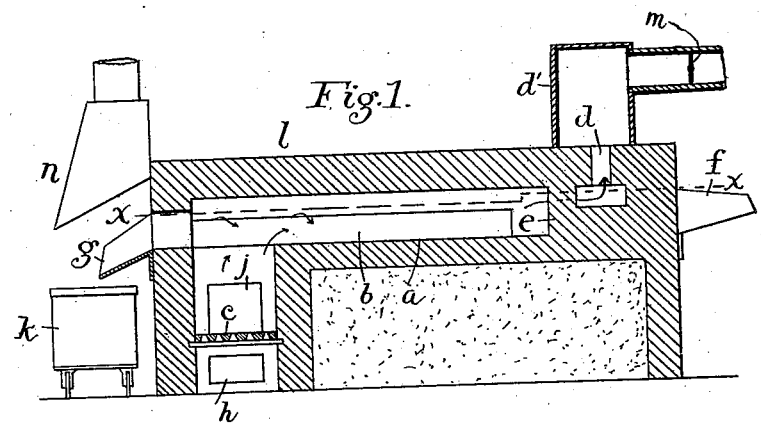

No. 692,972. Patented Feb. 11, 1902.
F. L. BARTLETT.
FURNACE FOR REFINING LEAD AND ZINC FUME.
(Application filed Mar. 25, 1901.)

(No Model.)

Witnesses:

Inventor:
Frank L. Bartlett

UNITED STATES PATENT OFFICE.

FRANK L. BARTLETT, OF CANON CITY, COLORADO.

FURNACE FOR REFINING LEAD AND ZINC FUME.

SPECIFICATION forming part of Letters Patent No. 692,972, dated February 11, 1902.

Application filed March 25, 1901. Serial No. 52,697. (No model.)

*To all whom it may concern:*

Be it known that I, FRANK L. BARTLETT, a citizen of the United States of America, and a resident of Canon City, Fremont county, State of Colorado, have invented certain new and useful Improvements in Furnaces for Refining Lead and Zinc Fume, of which the following is a specification.

My invention relates to a furnace for refining smelter-fume, such as is described in my United States Patent No. 406,868, dated July 16, 1889.

The process of refining as set forth in the above-named patent consisted of passing the raw fume through externally-heated pipes in the presence of air or of sulfurous-acid gas and continually stirring and scraping the fume from the walls of the retort during its passage through the same. The effect of this process was to remove the carbonaceous matter, reduce the sulfates and sulfids, and to volatilize the arsenic and other volatile impurities, leaving pure zinc and lead in the form of stable compounds suitable for a white pigment.

In practical operation the processes described gave satisfactory results and produced a pigment approaching white lead in color, weight, and consistency. I have discovered since making application for the above-named patents that a more perfect pigment can be produced and that the color and body may be improved by refining the raw fume in ovens or retorts arranged so as to allow the products of combustion from carbonaceous fuel, and particularly from a very smoky lignite or bituminous coal, to pass over and into the exposed fume while in a highly-heated condition and then discharging it into suitable receptacles, preferably into iron boxes, and allowing it to stand for some time, that it becomes very white, fine, and soft and is more eminently fitted for painters' use than pigment refined by my former processes. The raw pigment is a mixture of zinc oxid, zinc sulfate and sulfite, lead oxid, sulfite, sulfid, and sulfate, together with some carbon, arsenic, antimony, cadmium, and other elements.

According to my process as I put it into practical use I expose the raw fume on the hearth of the furnace, hereinafter described and claimed, over which the products of combustion of pure lignite are passed, together with a proper amount of air. The sulfites and sulfids are rapidly reduced to the oxids, the carbonaceous matter is burned out, the volatile matter readily driven off, and the lead oxid is to some extent converted into a carbonate, due to absorption of carbonic dioxid from the products of combustion. The process is extremely rapid, and when the color becomes a light yellow the pigment is at once drawn out into iron boxes, where it is allowed to remain at a low heat for about four hours. In this condition it absorbs some oxygen, softens, and becomes well fitted for purposes for which it is designed. The amount of air and of smoky flame which is admitted to the hearth is regulated by the operator by means of properly-constructed dampers—as, for instance, if the raw fume contains a large proportion of carbon less carbonaceous matter from the fuel is allowed to mix with the fume in the oven and more air is admitted at the will of the operator. The chemical reactions mostly take place in the center of the hearth, but are entirely under the control of the operator at all times.

The process may be carried on in any well-designed hearth or retort-furnace; but I have in the accompanying drawings shown a furnace specially designed to carry out this process, and it is this furnace which is the subject of the present invention, this process being the subject of an application filed herewith, Serial No. 52,696.

Figure 2:
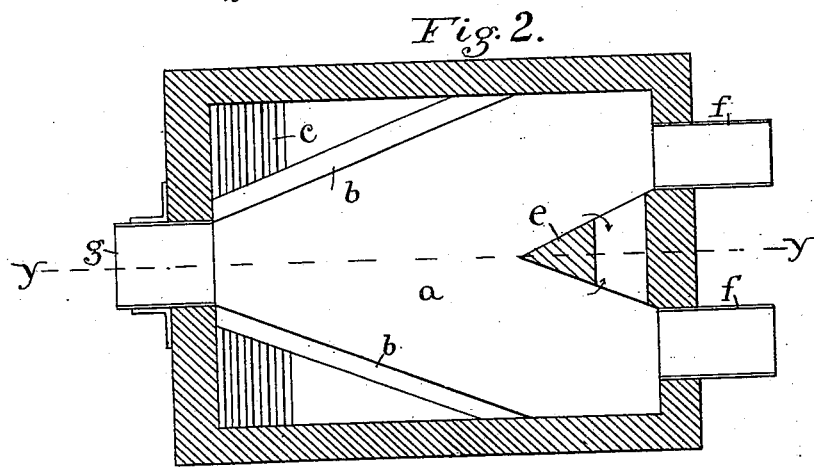
Figure 3:
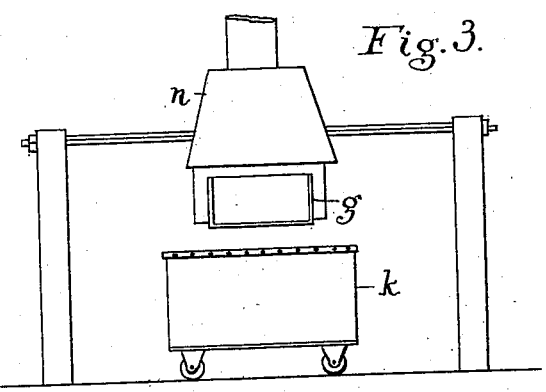

In the drawings, Figure 1 represents a vertical section of the furnace on the line $y\,y$ of Fig. 2. Fig. 2 is a section on line $x\,x$ of Fig. 1, and Fig. 3 is an end elevation of the same.

$a$ represents the flat hearth of the furnace, generally rectangular in shape, and $l$ is the top or arch. The fume is put in through the two doors $f\,f$, located at the end of the furnace, one at each side of the center, and it is withdrawn through a central discharge-opening $g$ at the other end of the furnace.

The grates $c\,c$, two in number, are at the corners at the discharge end and are below the level of the hearth $a$, with which they connect by means of vertical flues. Low bridge-walls *b* separate these flues from the hearth, these bridge-walls extending diagonally from the front to the side of the furnace.

*j* represents the furnace or firing-door, and *h* is the ash-pit door.

The products of combustion pass out through a flue *d* in the top of the furnace near the feed end and thence into a hood *d'* and through the stack, in which is a damper *m*, by which the admission of air to the furnace and the character of the flame are governed.

In order to avoid the escape of fume to the stack, a V-shaped protecting-wall is built between the feed-doors *ff*, extending to the top of the furnace at the inner end and nearly to the top directly beneath the opening *d*, so that the products of combustion pass in at the sides and then up, thus forming a circuitous passage to the stack. The fume is received as it comes from the furnace in an iron box or car *k*, and over the discharge-door is a ventilating-hood *n* for the purpose of carrying off the gases and preventing their escape in the room.

In operating I charge the raw fume into the doors *f* and push it forward in a mass until exposed to a low heat, banking the doors with the fume to prevent influx of cold air at the charging-doors. Fire is started in the fire-boxes and the furnace brought up to a low red heat, admission of air being regulated under the grates and the damper in the chimney connection. By checking the draft into the chimney a very smoky flame can be made to fill the entire furnace, or even to deposit soot in the furnace, or by opening the chimney-damper and allowing more air to pass the grates the flame can be changed at once to a clean smokeless heat. When the pile of fume in the rear is brought up to a low red heat, the operator begins to draw it forward toward the front of the hearth, constantly stirring and working the fume. As it reaches the front of the furnace it is subjected to the action of a clean flame heavily charged with carbonic dioxid, and it is subjected to this flame with continual stirring until the fume flashes out to a clean white or yellowish-white color, when it is ready to discharge into the iron box *k*, the hood *n* over the box being for the purpose of drawing off the dust and products of combustion away from the operator. At regular periods a fresh charge is pushed forward from the feed-doors, and the operator in front constantly draws the charges when in his opinion they are suitably refined, making the operation continuous.

An important feature of the process is to draw the hot fume rapidly into the box *k* in order to keep it hot until filled. As soon as it is filled it is drawn to one side and allowed to stand about four hours. It retains a low red heat and the reactions continue in the box, particularly the reduction of the lead oxid to a carbonate by the absorption of carbonic dioxid entangled in the loose fume cooling very gradually and absorbing oxygen as it cools. At the end of four or five hours the material has cooled enough so that the reactions cease. The top layer of about two inches is skimmed off, as it is somewhat discolored, and returned to the next refining operation in the ovens along with the raw fume. After skimming the balance in the box is found to be well refined and of an exceptionally fine white texture and is then ready for the market.

I claim—

The herein-described furnace for refining fume having a flat hearth, a feed-opening at one end and a discharge-opening at the other end, a fire-box on each side of the discharge-opening below the level of the hearth, vertical flues leading from the fire-boxes to the hearth and bridge-walls extending diagonally from the front to the sides, separating the fire-boxes from the hearth.

Signed at Portland, Maine, this 2d day of March, 1901.

FRANK L. BARTLETT.

Witnesses:
S. W. BATES,
L. M. GODFREY.